United States Patent [19]

Fukumura

[11] Patent Number: 4,742,563
[45] Date of Patent: May 3, 1988

[54] SYSTEM AND METHOD FOR DIVERSITY RECEPTION OF SIGNALS

[75] Inventor: Yukio Fukumura, Tokyo, Japan

[73] Assignee: NEC Corporation, Japan

[21] Appl. No.: 870,130

[22] Filed: Jun. 3, 1986

[30] Foreign Application Priority Data

Jun. 11, 1985 [JP] Japan .................. 60-125035

[51] Int. Cl.$^4$ ............................................. H04B 1/16
[52] U.S. Cl. .................................... 455/132; 455/134; 455/137; 455/136; 455/140
[58] Field of Search ............................. 455/132–139, 455/140, 277; 375/100

[56] References Cited

U.S. PATENT DOCUMENTS

| | | | |
|---|---|---|---|
| 4,403,343 | 9/1983 | Hamada | 455/134 |
| 4,450,585 | 5/1984 | Bell | 455/137 |
| 4,578,819 | 3/1986 | Shimizu | 455/135 |

FOREIGN PATENT DOCUMENTS 184341  11/1982  Japan .................. 455/134

OTHER PUBLICATIONS

IEEE Transactions on Vehicular Technology, vol. VT-33, No. 3, Aug. 1984, pp. 134–143, Edited by keisuke Suwa et al.

Microwave Mobile Communications, pp. 309–321, edited by William C. Jakes, Jr.

Primary Examiner—Michael A. Masinick
Attorney, Agent, or Firm—Laff, Whitesel, Conte & Saret

[57] ABSTRACT

A diversity reception of signals involves first and second mobile receivers which recover first and second baseband signals. The first and second receivers have first and second wave detectors, respectively, for generating output voltages corresponding to the strength of an FM modulated signal. When the difference in output voltages between the first and second detectors exceeds a predetermined value, a comparator gives an output detection signal. An adder circuit combines the first and second recovered baseband signals. First and second switching circuits selectively cut off the lower level one of the first or second recovered signal, which is then being supplied to the adder circuit. A third switching circuit adjusts the gain of the adder circuit. When the comparator does not give an output detection signal, the first and second switching circuits feed both the first and second recovered baseband signals to the adder circuit. At the same time, the third switching circuit reduces the gain of the adder circuit by one-half.

9 Claims, 2 Drawing Sheets

SYSTEM AND METHOD FOR DIVERSITY RECEPTION OF SIGNALS

This invention relates to the field of mobile wireless receivers, and more particularly to a method of diversity reception for achieving excellent voice communication quality in situations where the strength of the electromagnetic field reaching the receiver is subject to large scale fluctuations.

BACKGROUND

As is well known, mobile land communications and the like suffer from an undesirable phenomena called Rayleigh fading in which there are wide fluctuations in the strength of the received electromagnetic wave signals due to the influence on wave propagation of building structures and the relatively short 1-4 meter height of the antennas on vehicles. Various diversity reception methods have been used to ameliorate these fluctuations in the received electromagnetic signal. These include such techniques as automatic switching among several antennas, automatic selection from among several receivers, and the combining of signals from several receivers. See, for example, the discussion of basic diversity classifications and combining methods in the book *Microwave Mobile Communications*, William C. Jakes, Jr., editor, published by John Wiley & Sons, Inc. (New York 1974), particularly at pages 309-321.

OBJECTS OF THE INVENTION

Looking at the various diversity techniques mentioned above, automatic selection from among several receiving antennas (automatic antenna selection) has the disadvantage that at the time the antennas are switched a great deal of noise is generated in the receiver. The technique of combining signals from several receivers has the disadvantage that if this combining is done before demodulation, it is necessary to very carefully combine the phases of the received waves, which requires extremely complex devices. As for automatic selection from among several receivers, even if it has the advantage that the implementing construction is relatively simple, it has the disadvantage of requiring several receivers, only one of which is fully employed at any given time. Accordingly, the other receivers are relatively idle.

Therefore, in order to eliminate the disadvantages of the abovementioned techniques, an object of the present invention is to provide a method of diversity reception that in addition to being based on a method of automatic selection also incorporates the advantages of the method of combining signals from several receivers.

BRIEF DESCRIPTION OF THE INVENTION

In one embodiment, a diversity reception of signals is accomplished by first and second receivers which are respectively adapted to recover and output first and second recovered baseband signals. The first and second receivers have first and second wave detectors, respectively, for generating output voltages corresponding to the strength of a modulated electromagnetic signal wave reaching the respective receiver. Then, a comparator means detects the difference in output voltages between the first and second wave detectors, when the difference exceeds a predetermined value, and an output detection signal is given. An adder circuit is adapted to receive the first and second recovered baseband signals and to combine them in correlation.

First and second switching circuits are selectively capable of cutting off the first or second recovered signal, which signals are being input to the operational adder circuit. A third switching circuit is capable of adjusting the gain of the adder circuit, by reducing it by one half. When the comparator means gives an output detection signal, the first and second switching circuits are operated to cut off only the recovered baseband signal input from the input to the adder circuit which is then being received from the receiver having the lowest output voltage. When the comparator does not give the output detection signal, the first and second switching circuits are controlled so that both the first and second recovered baseband signals are input to the adder circuit. At the same time, the third switching circuit is controlled to reduce the gain of the adder circuit by one half. This causes the desired diversity output signal to be produced as the output of the adder circuit.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which.

PRIOR ART RECEIVER SWITCHING AND ITS DISADVANTAGES

Figure 3:
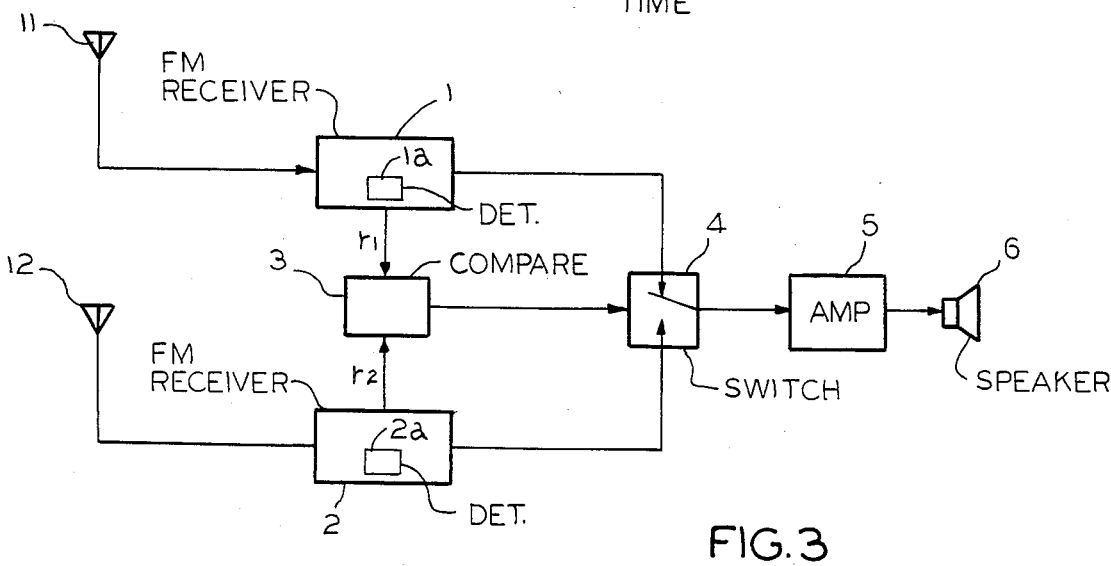
FIG. 3 is a functional block diagram showing a prior art method of automatic selection between multiple receivers.

The block diagram of FIG. 3 shows a prior art diversity method in which there is automatic selection between multiple receivers. For example, receivers 1 and 2 respectively have spaced apart receiving antennas 11 and 12. If the wavelength of the received signal is λ, then the antennas are preferably spaced apart a distance λ/4, or greater, so that their respective received signals will be virtually uncorrelated. This assures independent fading so that the improvement from diversity reception will be great.

The signals picked up by antennas 11 and 12 are respectively input to FM receivers 1 and 2 where they undergo the usual detection to recover the low frequency baseband signal. For determining signal strength, each of the receivers 1 and 2 contains a detector 1a, 2a for detecting the wave envelope of the received signal. Each wave envelope detector 1a, 2a generates an output voltage $r_1$, $r_2$ proportional to the strength of the electromagnetic wave picked up and input from its respective antenna 11, 12.

A comparator 3 receives as input the respective envelope detector output voltages $r_1$, $r_2$ of receivers 1 and 2, regularly determines which is greater, and then by means of switch 4 automatically selects the greater signal. The signal recovered from the receiver, which is selected by means of switch 4, is amplified by a low frequency baseband amplifier 5 and is output to a speaker 6.

Figure 4:
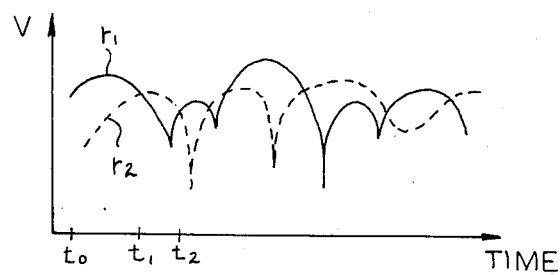
FIG. 4 shows, as a function of time, typical corresponding voltage outputs of the wave envelope detectors of the prior art method of FIG. 3.

FIG. 4 shows, as a function of time, typical corresponding voltage outputs $r_1$, $r_2$ of the wave envelope detectors 1a and 2a of the prior art method of FIG. 3. Assuming that the receiving system is a mobile one carried by a vehicle, the antennas 11 and 12 will be moving across the landscape at some transportation speed, causing the envelope detector output voltages $r_1$, $r_2$ to each vary irregularly with time. Note that during the time interval $t_0-t_1$ the voltage $r_1 > r_2$, indicating that the electromagnetic signal received by antenna 11 is greater, while during the interval $t_1-t_2$ the voltage $r_2 > r_1$, indicating that the signal received by antenna 12 has become greater. Therefore, during the interval $t_0-t_1$ receiver 1 is selected by switch 4, and afterward, during the interval $t_1-t_2$, receiver 2 is selected, etc.

Figure 5:
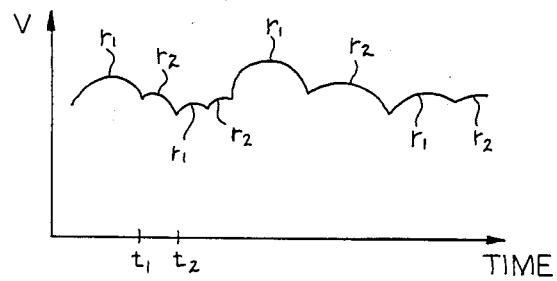
FIG. 5 is a modification of FIG. 4 made by tracing only the larger of the two voltage outputs for each point in time.
Figure 6:
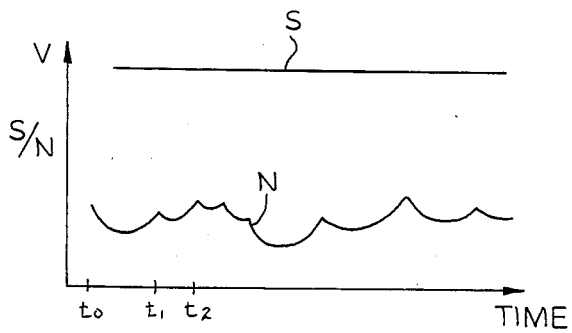
FIG. 6 shows for relative comparison the amplitude of a signal S as recovered by the prior art automatic receiver switching method of FIG. 3 and the amplitude of the noise N accompanying it, each as a function of time.

FIG. 5 is a modification of FIG. 4 made by tracing the envelope of only the instantaneously greater of the two voltage outputs $r_1$, $r_2$ for each point in time. Note that because of the automatic switching between receivers the large fluctuations of received electromagnetic signal have largely disappeared. For relative comparison, FIG. 6 shows the amplitude of a demodulated signal S as recovered by the prior art (FIG. 3) receiver switching method and the amplitude of the noise N accompanying it, each as a function of time. Because of the automatic switching of switch 4, during the interval $t_0-t_1$ the signal-to-noise ratio (S/N) is that of receiver 1 while during the interval $t_1-t_2$ the S/N is that of receiver 2, etc.

As stated above, the prior art method of automatic switching between receiver 1 and receiver 2 according to which has the stronger received signal can ameliorate the undesirable effects of Rayleigh fading. However, with this method only one of the receivers is selected at any time. Therefore, the remaining receivers are not usefully employed, which is especially a problem when a multiplicity of receivers are used together. The result is an undesirable cost/performance ratio.

EXAMPLE OF AN EMBODIMENT OF THE INVENTION

Figure 1:
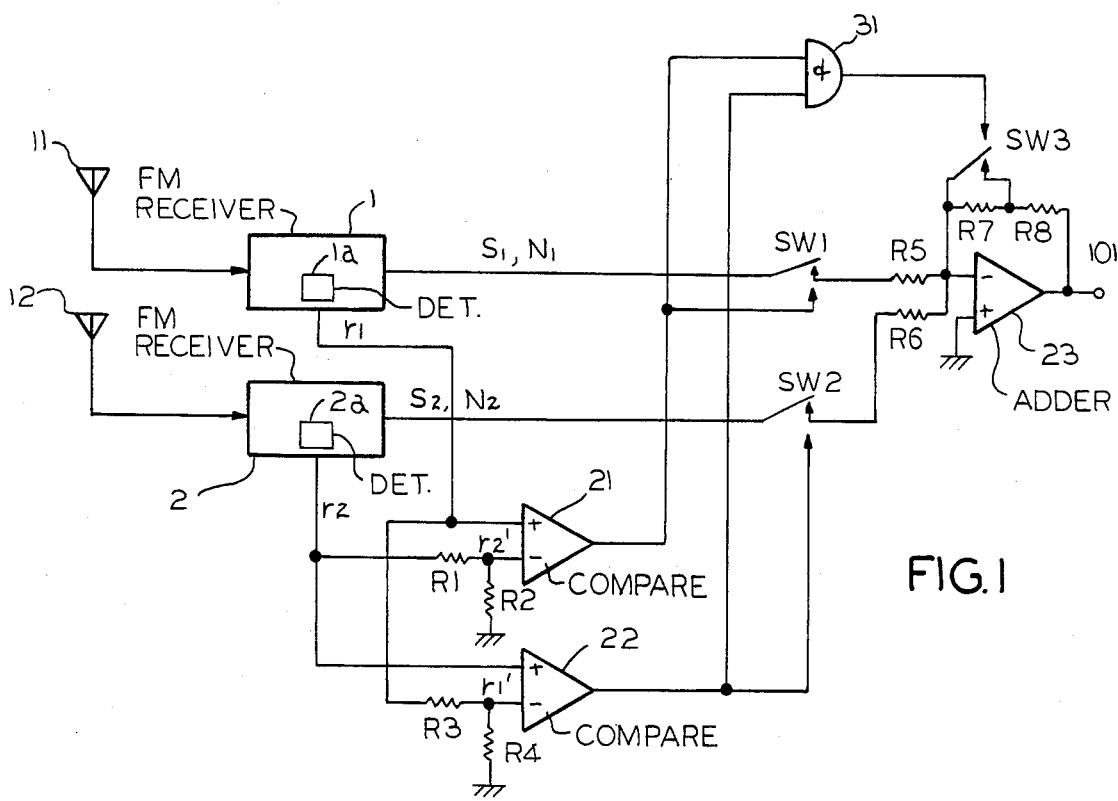
FIG. 1 is a simplified diagrammatic schematic of a multi-receiver embodiment utilizing my invention.

FIG. 1 is a simplified diagrammatic schematic of a multireceiver embodiment utilizing my invention to eliminate the above-mentioned disadvantages of receiver switching. In FIG. 1 the antennas 11, 12, the receivers 1, 2, the wave envelope detectors 1a, 2a, and detector outputs $r_1$, $r_2$, are the same as for FIG. 3's prior art method of automatic switching between multiple receivers.

However, in the embodiment utilizing my invention there are multiple comparators and other novel circuitry. A comparator 21 compares the signals $r_1$ and $r_2'$. By means of the voltage divider formed by resistors $R_1$ and $R_2$, the signal $r_2'$ is set to have the reduced value:

$$r_2' = \frac{1}{\sqrt{3}} r_2$$

The output of comparator 21 is arranged to output a "1" when $$r_1 \geq \frac{1}{\sqrt{3}} r_2$$

and to output a "0" when $$r_1 < \frac{1}{\sqrt{3}} r_2$$

As is typical with digital signals, the "1" output by comparator 21 can be selected to be represented by some convenient voltage, for example 5 volts, while the "0" output can be 0 volts.

Similarly, a comparator 22 compares the signals $r_2$ and $r_1'$. By means of the voltage divider forrmed by resistors $R_3$ and $R_4$, the signal $r_1'$ is set to have the reduced value:

$$r_1' = \frac{1}{\sqrt{3}} r_1$$

The output of comparator 22 is arranged to output a "1" when $$r_2 \geq \frac{1}{\sqrt{3}} r_1$$

and to output a "0" when $$r_2 < \frac{1}{\sqrt{3}} r_1$$

Switch SW1, shown diagrammatically for simplification, is adapted to be controlled by the output of comparator 21. When comparator 21 outputs a "1", switch SW1 becomes CLOSED and the recovered output signal $S_1$ of receiver 1 is input through input resistor $R_5$ to an operational adder 23, having an output 101 which is coupled to a low frequency baseband amplifier (not shown) and an output speaker (also not shown) similar to amplifier 5 and speaker 6 in FIG. 3. When comparator 22 outputs a "1", switch SW2 becomes CLOSED and provides the recovered output signal $S_2$ of receiver 2 to operational adder 23 through input resistor $R_6$.

The AND gate 31 is arranged so that if it simultaneously receives a "1" from both comparator 21 and comparator 22 it outputs a "1" to CLOSE switch SW3. Operational adder 23 can readily be formed from a differential-input-single-output-type operational amplifier, with the (+)input set to ground and the (−) input receiving signals which are to be added via input resistors $R_5$ and $R_6$, as well as a negative feedback via feedback resistors $R_7$ and $R_8$. As is well known, such an operational adder reverses the sign and multiplies each input by a factor $R_f/R_i$ where $R_f$ is the amplifier's feedback resistor and $R_i$ is the input resistor for the input branch concerned.

Thus, when switch SW1 is CLOSED and SW2 is OPEN, switch SW3 will also be OPEN and only recovered signal $S_1$ of receiver 1 will be input to operational adder 23, where it is then output multiplied by the factor $$(R_7+R_8)/R_5.$$

Similarly, when switch SW1 is OPEN and SW2 is CLOSED, switch SW3 will also be OPEN and only recovered signal $S_2$ of receiver 2 will be input to operational adder 23, where it is then output multiplied by the factor $$(R_7+R_8)/R_6.$$

Finally, there is the frequent case where both switches SW1, SW2 are simultaneously CLOSED, in which case switch SW3 is also CLOSED, shorting out resistor $R_7$. Recovered signal $S_1$ of receiver 1 will then appear in the output of operational adder 23 multiplied by the factor $R_8/R_5$ along with recovered signal $S_2$ of receiver 2 multiplied by the factor $R_8/R_6$. If resistors $R_5$, $R_6$, $R_7$, and $R_8$ are all chosen to be the same value, the output signal at terminal 101 (i.e. the diversity reception output signal) will be 2 $S_1$ when switch SW1 is CLOSED and switch SW2 is OPEN. When switch SW1 is OPEN and switch SW2 is CLOSED, the output signal at 101 will be 2 $S_2$. And if both switches SW1, SW2 are CLOSED, then switch SW3 will also be closed and the combined output signal at 101 will be $S_1+S_2$.

Let us now consider the signal-to-noise ratio (S/N) of the receiver system for an FM receiver. For certain electromagnetic waves signals, namely those at the threshold of a detection level and above, if the recovered signal S is kept uniform the noise accompanying it has the characteristic of being inversely proportional to the strength of the received electromagnetic signal. If we call $N_1$ and $N_2$ the noises respectively accompanying the recovered signals of receiver 1 and 2, and if we assume that either switch SW1 or SW2 is OPEN, then at the output terminal 101 the signal-to-noise ration (S/N) will be that of the single selected receiver with the stronger received electromagnetic signal, namely $S_2/N_2$ or $S_1/N_1$.

But when both switches SW1, SW2 are simultaneously CLOSED, that is when the received electromagnetic signals input to the two receivers are roughly comparable, then the signal to noise ratio at output terminal 101 will be:

$$\frac{S}{N} = \frac{S_1 + S_2}{\sqrt{N_1^2 + N_2^2}}$$

That is to say, the received signals $S_1$ and $S_2$ being correlated are summed by the operational adder 23 as $S=S_1+S_2$. However, as the recovered noises $N_1$ and $N_2$ are uncorrelated, the effect of an input of both noise signals to the operational adder 23 is a combined noise N having amplitude given by the formula $$N=\sqrt{N_1^2+N_2^2}$$

For example, if we consider the case where the signal strengths reaching the two receivers are equal, then $S_1=S_2$, and $N_1^2=N_2^2$ so the combined S/N computes to be $$\frac{S}{N} = \sqrt{2}\ \frac{S_1}{N_1} = \sqrt{2}\ \frac{S_2}{N_2}$$

which means an improvement only by the factor $\sqrt{2}$, or 3 dB in terms of decibels.

Let us now consider the output at terminal 101 in the case where $$r_2 = \frac{1}{\sqrt{3}} r_1$$

That is, the electromagnetic signal reaching receiver 1 is $\sqrt{3}$ times larger than that reaching receiver 2. Since the noise in the recovered signal is inversely proportional to the strength of the received electromagnetic wave, the recovered noise at receiver 2 as compared with the recovered noise in receiver 1 is given by $$N_2=\sqrt{3}\ N_1.$$

Then if we assume that both switches SW1 and SW2 are CLOSED, the signal-to-noise ratio at the output terminal 101 is given by $$\frac{S}{N} = \frac{2 S_1}{\sqrt{N_1^2 + 3N_1^2}} = \frac{S_1}{N_1}$$

This is clearly a marginal case since if the signal strength reaching receiver 2 is any further reduced, i.e.

$$r_2 < \frac{1}{\sqrt{3}} r_1$$

with both SW1 and SW2 CLOSED the combined S/N output at terminal 101 will become worse than the ratio $S_1/N_1$ for receiver 1 alone. This explains why it is necessary to automatically OPEN switch SW2 when the signal at receiver 2 falls into this low range.

Note also that when just one receiver is being input to operational adder 23 (e.g., switch SW1 is CLOSED, SW2 OPEN), the adder gain is 2, but when an additional receiver is switched in (e.g., SW1 remains CLOSED, SW2 becomes CLOSED), switch SW3 must automatically be closed to drop the adder's gain to 1 so the new combined recovered signal $S_1+S_2$ at terminal 101 maintains an approximately equivalent amplitude when compared to the terminal's output for the just prior one-receiver signal (viz., 2 $S_1$). That is, should switch SW3 be left OPEN when switches SW1 and SW2 are simultaneously CLOSED, the recovered signal S output level at terminal 101 will jump to double what it was when one of the switches SW1, SW2 was OPEN. Assuming that the fading phenomena has a relatively short typical period, this would cause the received signal level S to repeatedly fluctuate, contributing a large component to the perceived noise.

Referring to Table 1, the relationship between signals $r_1$ and $r_2$ and the position of switches SW1, SW2, and SW3 is shown, from which it is clear that the illustrated embodiment utilizing my invention has three distinct states.

TABLE 1

RELATIONSHIP OF SIGNALS $r_1$ & $r_2$ TO SWITCH POSITIONS

|  | STATE 1 $r_1 > \sqrt{3}\, r_2$ | STATE 2 $r_2 > \sqrt{3}\, r_1$ | OTHERWISE |
| --- | --- | --- | --- |
| SW1 | CLOSED | OPEN | CLOSED |
| SW2 | OPEN | CLOSED | CLOSED |
| SW3 | OPEN | OPEN | CLOSED |

Figure 2:
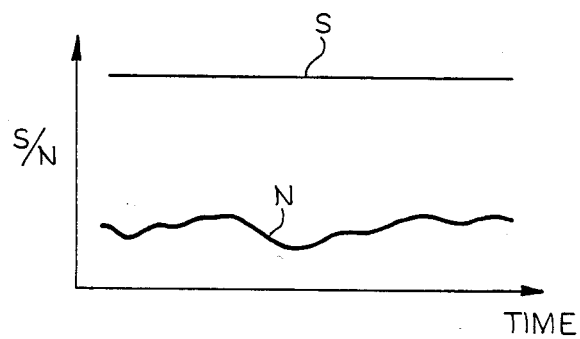
FIG. 2 shows, for relative comparison, the amplitude of a signal S recovered by the embodiment of FIG. 1 and the amplitude of the noise N accompanying it, each as a function of time.

For relative comparison, FIG. 2 shows the amplitude of a signal S recovered by the embodiment of FIG. 1 by utilizing my invention and shows the amplitude of the noise N accompanying it, each as a function of time. When this is compared with the unsophisticated S/N performance of the prior art post-detection selection switching of FIG. 6, one finds that there is an improvement that can be as large as 3 dB.

Therefore, as explained above, my very effective method for diversity reception of signals can be utilized by a receiver system having very simple structure. In addition to two separate receivers, one provides an adder circuit for combining signals recovered from the two receivers, means for cutting off the weaker received signal when the difference in the amplitudes of the electromagnetic signals reaching two receivers becomes great, and means for adjusting the gain of the adder circuit to maintain a uniform received signal level when switching to adding together two received signals.

While the principles of the invention have been described above in connection with specific apparatus and applications, it is to be understood that this description is made only by way of example and not as a limitation on the scope of the invention. Therefore, the claims are to be construed to cover all equivalent structures.

I claim:

1. A system for diversity reception of signals with first and second receivers, respectively adapted to recover and output first and second recovered baseband signals, said system comprising:

(a) first and second wave detector means, respectively, in the first and second receivers for generating output voltages corresponding to the strengths of a modulated electromagnetic signal wave reaching the respective receivers;

(b) comparator means coupled to the first and second receivers for detecting and for giving an output detection signal when the difference in output voltages between the first and second wave detectors exceeds a predetermined value;

(c) adder circuit means responsive to the first and second recovered baseband signals for correlating and combining said baseband signals;

(d) first and second switching circuits selectively capable of cutting off the first or second recovered signal to the adder circuit means, and a third switching circuit coupled to adjust the gain of the adder circuit means by selectively reducing it by one half;

(e) means responsive to the comparator means for controlling the first and second switching circuits to cut off only the recovered baseband signal being applied from the receiver having a lower output voltage to the adder circuit means; and (f) means responsive to an absence of the comparator output detection signal for controlling the first and second switching circuits to cause both the first and second recovered baseband signals to be input to the adder circuit means, and at the same time for controlling the third switching circuit to reduce the gain of the adder circuit by one half;

thereby producing a diversity output signal with substantially uniform gain as the output of the adder circuit means.

2. A system for diversity reception of signals, said system having a plurality of receivers and comprising means for comparing the levels of signals reaching said plurality of receivers; means responsive to the comparing means for adding and combining signals recovered by said plurality of receivers; switching means for cutting off the weaker of the output signals from the receivers when each difference between compared levels reaches a threshold level; and means for adjusting the gain of said adding and combining means to maintain a uniform signal level regardless of the switching of said signals by said switching means.

3. The system of claim 2 wherein each of said receivers includes a wave envelope detector means, and said comparing means is coupled to respond to the output of the wave envelope detectors in said receivers.

4. The system of claim 3 and means for operating the switching means responsive to the instantaneous output of said wave envelope detectors.

5. A system for diversity reception of signals at a plurality of mobile receivers, said system comprising at least two FM receivers, each of said receivers including at least an envelope detector means, a pair of difference amplifier means coupled to said receivers for comparing levels of the output of said detector means, adding means responsive to the outputs of said difference amplifiers for combining outputs recovered by said receivers, switching means for opening a path of one of said receivers having a low level output to the adding means in response to said comparing means finding a difference in said detector means output levels which exceeds a given amount, and means for adjusting a gain of said adding means to maintain a given output level regardless of whether said adding means receives an output from one or more of said receivers.

6. The system of claim 5 wherein there is a voltage divider associated with an input of each of said difference amplifier means, one end of said voltage divider being coupled to an output of an associated one of said envelope detector means, and an intermediate point of said voltage divider being coupled to the input of the associated difference amplifier.

7. The system of claim 6 and an AND gate having inputs coupled to outputs of each of said difference amplifiers, and means responsive to the output of said AND gate for adjusting the gain of said adding means.

8. The system of claim 7 wherein said switching means is coupled between an associated output of each of said mobile receivers and an associated inputs of said adding means.

9. A method for diversity reception of signals for use with a first receiver and a second receiver, respectively adapted to recover and output a first recovered baseband signal and a second recovered baseband signal, said method for diversity reception comprising the steps of:

(a) generating output voltages corresponding to the strength of the modulated electromagnetic signal wave reaching the respective receiver;

(b) detecting when the difference in the output voltages exceeds a predetermined value and outputting a detection signal to that effect;
(c) when the detection signal is present, cutting off the recovered baseband signal from the receiver having the lower output voltage; and;
(d) when the detection signal is not present, combining the first and second recovered baseband signals in correlation to produce a combined signal, and at the same time controlling the gain of the combined signal by half; thereby producing the desired diversity output signal.

* * * * *